(12) United States Patent
Anderson et al.

(10) Patent No.: US 6,724,951 B1
(45) Date of Patent: Apr. 20, 2004

(54) USING FIBERS AS SHIFTING ELEMENTS IN OPTICAL INTERCONNECTION DEVICES BASED ON THE WHITE CELL

(75) Inventors: Betty Lise Anderson, Gahanna, OH (US); Stuart A. Collins, Jr., Worthington, OH (US)

(73) Assignee: The Ohio State University, Columbus, OH (US)

( * ) Notice: Subject to any disclaimer, the term of this patent is extended or adjusted under 35 U.S.C. 154(b) by 13 days.

(21) Appl. No.: 10/106,776

(22) Filed: Mar. 26, 2002

(51) Int. Cl.[7] ................................................ G02B 6/26
(52) U.S. Cl. .............................. 385/15; 385/27; 385/31; 385/119
(58) Field of Search .............................. 385/15, 27, 31, 385/32, 39, 47, 115, 116, 119, 120, 137, 147

(56) References Cited

U.S. PATENT DOCUMENTS

| | | | |
|---|---|---|---|
| 3,755,676 A | * 8/1973 | Kinsel | 398/55 |
| 3,892,468 A | * 7/1975 | Duguay | 385/4 |
| 4,225,938 A | 9/1980 | Turpin | 708/816 |
| 4,474,434 A | 10/1984 | Carlsen et al. | 359/320 |
| 4,474,435 A | 10/1984 | Carlsen et al. | 359/320 |
| 4,546,249 A | * 10/1985 | Whitehouse et al. | 250/227.11 |
| 5,117,239 A | 5/1992 | Riza | 342/375 |
| 5,276,758 A | * 1/1994 | Hughes | 385/116 |
| 5,319,477 A | 6/1994 | DeJule et al. | 349/65 |
| 5,463,497 A | 10/1995 | Muraki et al. | 359/619 |
| 5,465,175 A | 11/1995 | Woodgate et al. | 359/619 |
| 5,512,907 A | 4/1996 | Riza | 342/375 |
| 5,859,697 A | * 1/1999 | Lopez et al. | 356/213 |
| 5,936,759 A | 8/1999 | Buttner | 359/291 |
| 6,014,244 A | 1/2000 | Chang | 259/281 |
| 6,064,506 A | 5/2000 | Koops | 359/237 |
| 6,188,817 B1 | 2/2001 | Goodfellow | 385/24 |
| 6,236,506 B1 | 5/2001 | Cao | 359/484 |
| 6,266,176 B1 | 7/2001 | Anderson et al. | 359/245 |
| 6,388,815 B1 | 5/2002 | Collins et al. | 359/633 |
| 2002/0030814 A1 | * 3/2002 | Mikes et al. | 356/328 |

FOREIGN PATENT DOCUMENTS

JP          10333089 A  * 12/1998  ........... G02B/27/18

OTHER PUBLICATIONS

Collins, Jr et al., Optical True Time Delay for Phased Array Antnnas Based on the White Cell, GOMA, Monterey, California, 4 pp. (Mar., 1999).

Anderson et al., Design Advances in Free–Space Optical True–Time Delay Device, PSAA–8, Monterey, California, 4 pp. (Jan., 1998).

Anderson et al., Binary–Counting True Time Delay Generator Using a White Cell Design and Deformable Mirror Devices, LEOS, Orlando, Florida, 2 pp. (Dec., 1998).

Anderson et al., Highly Parallel Optical Device to Produce True Time Delays for Phased Array Antennas, Allerton, 14 pp. (Sep., 1998).

(List continued on next page.)

*Primary Examiner*—John D. Lee
(74) *Attorney, Agent, or Firm*—Standley Law Group LLP

(57) ABSTRACT

The present invention comprises a shifting unit that uses optical fibers to shift beams among various outputs. The shifting unit comprises a shifting entrance plane and a shifting exit plane. The shifting entrance plane comprises at least one row of signal input positions. Each signal input position is adapted to receive an optical signal from a source. The shifting exit plane comprises a respective number of rows of signal output positions. Each signal output position is adapted to output an optical beam. Each signal input position of a given row is connected by an optical fiber to a corresponding signal output position. Also, each optical fiber is the same length as every other optical fiber in the shifting unit. The present invention also comprises methods and apparatus comprising the shifting unit.

9 Claims, 6 Drawing Sheets

OTHER PUBLICATIONS

Anderson et al., Optically Produced True–Time Delays for Phased Antenna Arrays, Applied Optics, vol. 36, No. 32, pp. 8493–8503 (Nov., 1997).

Collins et al., Optics for Numerical Calculation, Proceedings of ICO–11 Conference, Madrid, Spain (1978).

Collins, Numerical Optical Data Processor, SPIE vol. 128, Effective Utilization of Optics in Radar Systems, pp. 313–319 (1977).

Collins et al., Numerical Optical Data Processing, Proceedings of the 1978 International Optical Computing Conference, London, England, pp. 194–197 (Sep., 1978).

Freitag et al., A Coherent Optically Controlled Phased Array Antenna System, IEEE Microwave and Guided Wave Letters, vol. 3, No. 9, Sep., 1993, 293–295.

Gpitzpilis et al., Hybrid Electronic Fiber Optic Wavelength–Multiplexed System for True Time–Delay Steering of Phased Array Antennas, Optical Engineering, vol. 31, No. 11, Nov., 1992, pp. 2312–2322.

Cohen et al., Optically Controlled Serially Fed Phased Array Sensor, IEEE Photonics Technology Letters, vol. 8, No. 12, Dec., 1996, pp. 1683–1685.

Fairley, Peter, The Microphotonics Revolution, Mit's Magazine of Innovation, Technology Review, Jul./Aug., 2000, pp. 38–44.

* cited by examiner

USING FIBERS AS SHIFTING ELEMENTS IN OPTICAL INTERCONNECTION DEVICES BASED ON THE WHITE CELL

TECHNICAL FIELD OF THE INVENTION

The present invention is in the field of optical interconnection devices, such as those that may be useful in routing information for communications systems.

BACKGROUND OF THE INVENTION

U.S. Pat. No. 6,266,176 discloses a device for optical interconnection.

An object of the present invention is to provide a binary (or higher order exponential) optical interconnection using optical fibers to shift beams among various outputs.

In U.S. Pat. No. 6,266,176, an optical interconnection device was described in which multiple light beams bounced repeatedly between a set of spherical mirrors. Each light beam produces a specific spot pattern based on which of the mirrors are visited and how many times. In the original invention, the spots for each beam were shifted by the spherical mirrors, whose centers of curvature were located in different positions. In the present invention, the shifting is accomplished instead by a shifting unit located in an image plane of the spatial light modulator. In this case the shifting unit consists of various optical fibers, each os whose inputs intercepts a given spot and whose output reproduces the spot in a new row or column.

SUMMARY OF THE INVENTION

As used herein, the term "shifter" shall be understood to mean a shifting unit. As used herein, the term "source" shall be understood to mean any source, structure, article or device either generating or reflecting an optical beam.

In broadest terms, a shifting unit using optical fibers to shift beams among various outputs of the present invention comprises: a shifting entrance plane and a shifting exit plane. The shifting entrance plane comprises at least one row of signal input positions. Each signal input position is adapted to receive an optical beam from a source. The shifting exit plane comprises a respective number of rows of signal output positions. Each signal output position is adapted to output an optical beam received by the shifting entrance plane. Each signal input position of a given row is connected by an optical fiber to a corresponding signal output position. Each optical fiber is the same length as every other optical fiber in the shifting unit An apparatus for optically shifting signals of the present invention comprises: an auxiliary mirror; a micro-electro-mechanical device (or other spatial light modulator); a shifting unit; a first pair of spherical mirrors; and a second pair of spherical mirrors. The shifting unit comprises: a shifting entrance plane and a shifting exit plane. The shifting entrance plane comprises at least one row of signal input positions. Each signal input position is adapted to receive an optical beam from a source. The shifting exit plane comprises a respective number of rows of signal output positions. Each signal output position is adapted to output an optical beam received by the shifting entrance plane. Each signal input position of a given row is connected by an optical fiber to a corresponding signal output position. Each optical fiber is the same length as every other optical fiber in the shifting unit. Each mirror of the first pair of spherical mirrors has a center of curvature. Each mirror of the first pair of spherical mirrors is positioned such that its center of curvature (or the image of the center of curvature) lies between the auxiliary mirror and the micro-electro-mechanical device. Each mirror of the second pair of spherical mirrors has a center of curvature. Each mirror of the second pair of spherical mirrors is positioned such that its center of curvature lies between the micro-electro-mechanical device and the shifting unit.

In a preferred embodiment of the present invention, the auxiliary mirror, micro-electro-mechanical device lie in one plane, and the entrance and exit of the shifting unit lie in a second plane. In another preferred embodiment of the present invention, the apparatus further comprises at least one optical element disposed between the first and second planes.

A second apparatus for optically shifting signals of the present invention comprises: a micro-electro-mechanical device disposed in a first plane; an auxiliary mirror disposed in a second plane; a shifting unit disposed in a third plane; and a pair of lenses disposed between the shifting unit and the micro-electro-mechanical device. The shifting unit comprises: a shifting entrance plane and a shifting exit plane. The shifting entrance plane comprises at least one row of signal input positions. Each signal input position is adapted to receive an optical beam from a source. The shifting exit plane comprises a respective number of rows of signal output positions. Each signal output position is adapted to output an optical beam received by the shifting entrance plane. Each signal input position of a given row is connected by an optical fiber to a corresponding signal output position. Each optical fiber is the same length as every other optical fiber in the shifting unit.

In a preferred embodiment, the apparatus further comprises at least one optical element disposed between the first plane and the second plane.

A method for optically shifting a signal of the present invention comprises the steps of: modulating an input signal onto an optical beam; passing the optical beam through an apparatus for spatially shifting signals; and down-converting the optical beam to an output signal. The apparatus comprises an auxiliary mirror; a micro-electro-mechanical device; a shifting unit; a first pair of spherical mirrors; and a second pair of spherical mirrors. The shifting unit comprises a shifting entrance plane and a shifting exit plane. The shifting entrance plane comprises at least one row of signal input positions. Each signal input position is adapted to receive an optical beam from a source. The shifting exit plane comprises a respective number of rows of signal output positions. Each signal output position is adapted to output an optical beam received by the shifting entrance plane. Each signal input position of a given row is connected by an optical fiber to a corresponding signal output position. Each optical fiber is the same length as every other optical fiber in the shifting unit. Each mirror of the first pair of spherical mirrors has a center of curvature. Each mirror of the first pair of spherical mirrors is positioned such that its center of curvature lies between the auxiliary mirror and the micro-electro-mechanical device. Each mirror of the second pair of spherical mirrors has a center of curvature. Each mirror of the second pair of spherical mirrors is positioned such that its center of curvature lies between the micro-electro-mechanical device and the shifting unit.

A second method of the present invention for optically shifting a signal comprises the steps of: modulating an input signal onto an optical beam; passing an optical beam through an apparatus for optically shifting signals; and down converting the optical beam to an output signal. The apparatus comprises: a micro-electro-mechanical device disposed in a first plane; an auxiliary mirror disposed in the first plane; a shifting unit disposed in a second plane; and a pair of lenses disposed between the shifting unit and the micro-electro-mechanical device. The shifting unit comprises a shifting entrance plane and a shifting exit plane. The shifting entrance plane comprises at least one row of signal input positions. Each signal input position is adapted to receive an optical beam from a source. The shifting exit plane comprises a respective number of rows of signal output positions. Each signal output position is adapted to output an optical beam received by the shifting entrance plane. Each signal input position of a given row is connected by an optical fiber to a corresponding signal output position. Each optical fiber is the same length as every other optical fiber in the shifting unit.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE PREFERRED EMBODIMENTS

In accordance with the foregoing summary, the following presents a detailed description of the preferred embodiment of the invention that is currently considered to be the best mode.

Figure 1:
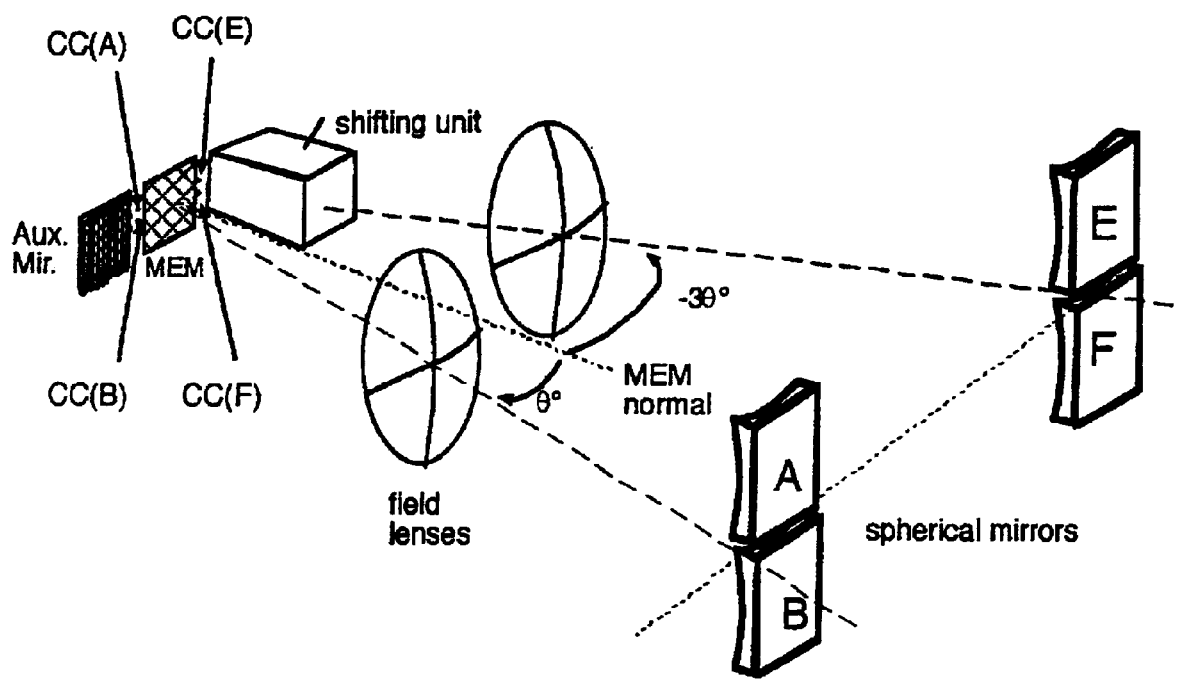
FIG. 1 illustrates an overall view of a binary optical interconnection device.

One possible implementation of a binary optical interconnection is shown in FIG. 1. On the left is a micro-electro-mechanical (MEM) device, which in this case is an array of micro-mirrors, each of which can tip to two different angles, ±θ, with respect to the normal to the MEM plane and about a vertical axis. In the same plane as the MEM are an auxiliary mirror and a shifting unit. The auxiliary mirror may require a stepped or sawtooth surface to properly image the tilted mirrors of the MEM. The shifting unit (which shift spots from one column to another to direct the beams to different outputs) in this disclosure will become a fiber array. There are two field lenses in front of the MEM plane. On the right we have two pairs of spherical mirrors. The centers of curvature (CC) of each mirror is indicated in the figure.

Mirrors A, B, the auxiliary mirror and the MEM plane with the field lens form a White cell. To briefly review the operation, suppose every micromirror is tipped to +θ. We consider light traveling from Mirror B toward the MEM. Then the light from Mirror B will return to Mirror A, from which it goes to the Auxiliary Mirror. Light bounces back and forth between B, the MEM, A, and the Aux. Mirror, and is refocused to a new spot each time it strikes the plane containing the MEM and the auxiliary mirror. We will discuss the spot pattern shortly.

Now suppose that light strikes the MEM after coming from Mirror B, but this time the micro-mirror is tipped to −θ. This directs the light to Mirror E. From E the light goes to the shifting unit. It returns from the shifting unit at a spot that is displaced from the original spot by some distance δ. The light returning from the shifting unit goes this time to Mirror F, and then back to the MEM.

Care must be taken to make the path MEM-A-Auxiliary Mirror-B-MEM of the same overall length as the path MEM-E-shifting unit-F-MEM, to avoid latency.

Figure 2:
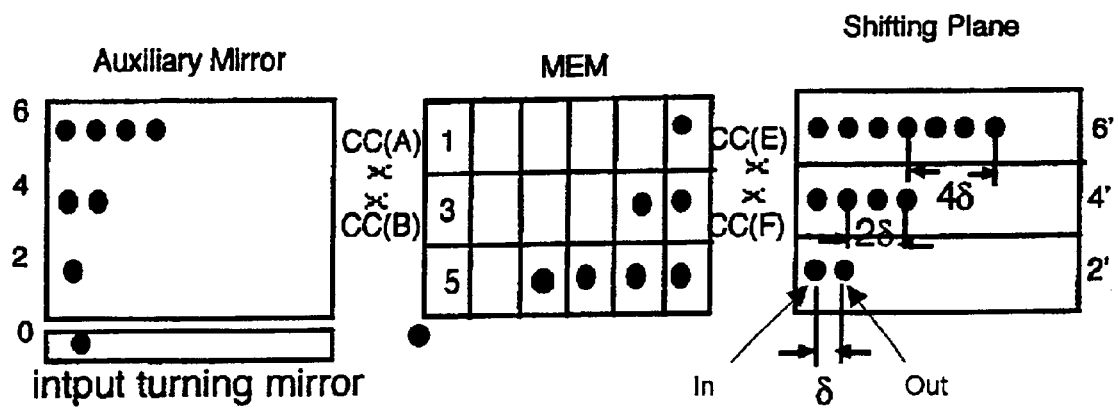
FIG. 2 illustrates the spot pattern for one beam making six bounces in accordance with one embodiment of the present invention.

We have said that the light forms spots on the MEM plane. We now discuss the spot pattern with the help of FIG. 2. The figure shows the front of the MEM in the middle with the auxiliary mirror to the left and the entrance to the shifting unit on the right. We show a single light beam's pattern. The beam is input into the cell via an input turning mirror just below the Auxiliary Mirror. The beam forms a spot labeled "0" there. The input turning mirror is adjusted so as to direct the light to Mirror B. Mirror B images this spot onto the MEM, at a location that is an equal and opposite distance from Mirror B's center of curvature CC(B). The new spot is labeled "1," the first bounce.

If the micromirror is tipped to +θ, the light goes to Mirror A. Mirror A images the first spot, on the MEM, to a second spot on the auxiliary mirror. This appears and equal and opposite distance about A's center of curvature, in this case at the far left of row 2. From the auxiliary mirror the light returns to Mirror B, thence to row 3 on the MEM, and the process continues. Mirror B forms odd-numbered spots on the MEM and Mirror A forms even numbered spots on the auxiliary mirror.

Now suppose on a given odd-numbered bounce, the MEM micromirror is tipped to −θ. Then the light goes to Mirror E. Mirror E forms the next even-numbered spot, this time on the shifting plane, which is a plane in the shifting unit that is conjugate to the MEM. Light passing through a spot on the shifting plane enters the shifting unit, and is returned to the shifting plane in a spot shifted by some amount. For example, a spot landing on the shifting unit in row 2' will enter at the far left, and return shifted over by one increment δ. So far we haven't said how this shift is produced.

In row 3 on the MEM, there are two possible spots, one if the beam went to the auxiliary mirror and the other if the beam went to the shifting unit. On the next round of bounces, the spot can be shifted by 2δ and so forth.

Using Fibers in the Shifting Unit

Figure 3:
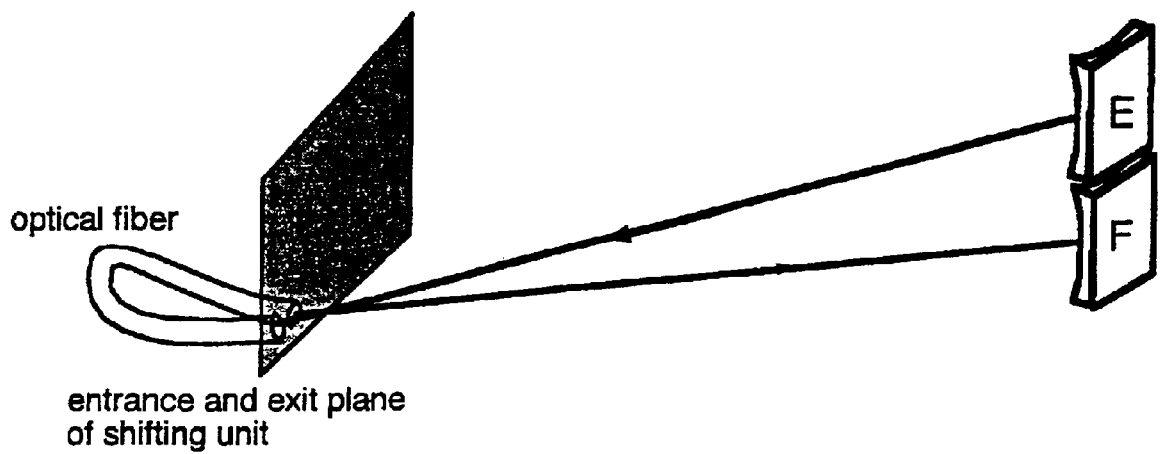
FIG. 3 shows the use of a single fiber as an example of a shifting element.

One way to provide the shifting is to use optical fibers. One could place a fiber that led from the first spot in row 2 on the shifting unit to the second, but there is a problem. Light entering a fiber must do so parallel to the fiber's axis (or close to it) to maximize the coupling efficiency, and light emitted from the fiber will also be traveling in a direction close to parallel to the fiber's axis. Thus the fiber input and output faces must be tipped in slightly different directions, as shown for one fiber in FIG. 3.

Figure 4:
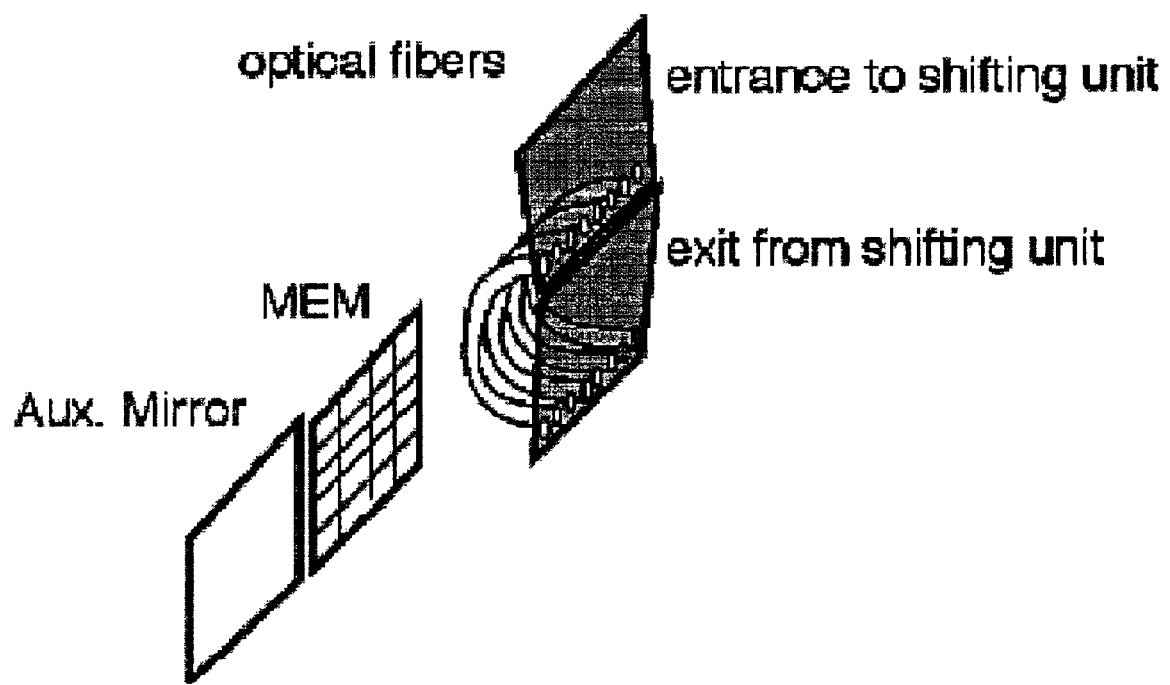
FIG. 4 shows the alignment of the auxiliary mirror, micro-electro-mechanical device (MEM), and shifting unit in accordance with one embodiment of the present invention.

It will be difficult in practice to individually tip the fibers with the required precision. We therefore break up the shifting plane into two planes, one a shift unit entrance plane and one a shift unit exit plane. This is shown in FIG. 4. Here light coming from Mirror E forms a spot on the entrance plane, and enters an appropriate fiber. The lengths of the fiber will all be the same, but the amount of displacement they provide is different from row to row. The light exits the fiber in the exit plane shown in the figure. The entrance plane is Upped slightly so its normal intersects Mirror E, and the exit plane is tipped so its normal intersects Mirror F.

Figure 5:
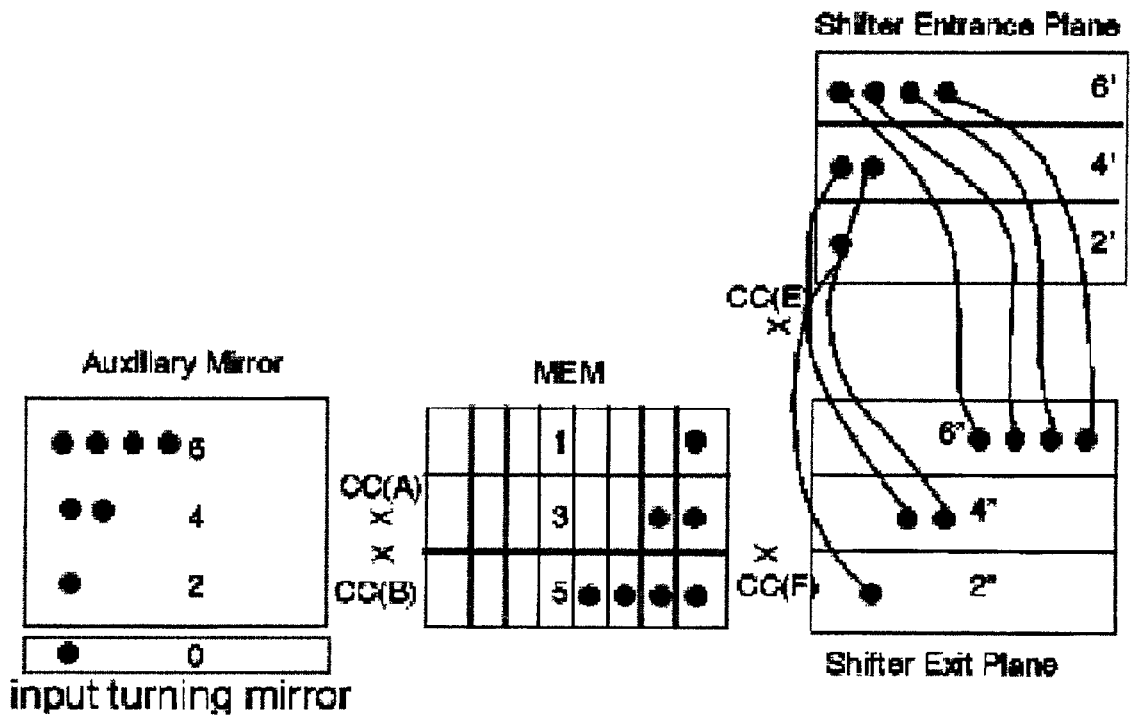
FIG. 5 illustrates the alignment of the spherical mirrors for a fiber implementation of a shifting device.

FIG. 5 shows the centers of curvature for the spherical mirrors. Suppose a beam is switched toward the shifting element on bounce 3 on the MEM. The light goes to Mirror E, which forms a spot on the entrance to the shifter entrance plane in row 4'. One end of a fiber of appropriate length is located here. The other end is in row 4" on the shifter exit plane, but displaced by the appropriate number of spots. Light exiting the fiber goes to mirror F, which images the fiber facet back onto the MEM, this time at point 5. Depending on where the beam has gone before, there are two possible points to enter the shifter on bounce 4 and two places to leave it. There are additionally two places the spot could land on the MEM after the fourth bounce since the beam may have gone to the auxiliary mirror on the previous trip, or not.

Figure 6:
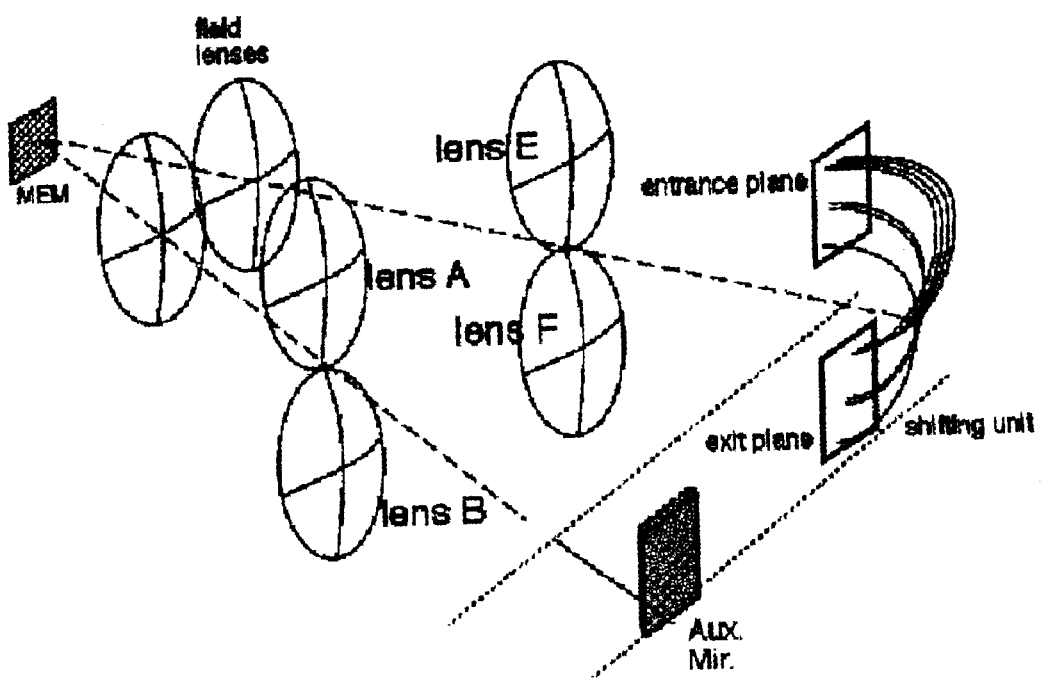
FIG. 6 is an alternative arrangement of the shifting fibers, in which the White cells are unfolded, in accordance with one embodiment of the present invention.

Another way of arranging the fiber planes is shown in FIG. 6. Here the light going to the shifting unit passes through lens E (replacing the spherical mirror E), and is imaged onto the entrance plane of the fiber shifting unit. The light emerging from the fibers passes through Lens F, which images the spots back onto the MEM. In each case, the optical path distance in the MEM-Mirror A-Auxiliary Mirror-Mirror B-MEM path should be the same as the optical path distance for the MEM-Mirror E-Shifter-Mirror F-MEM path, to equalize the latency.

While the invention has been described in connection with what is presently considered to be the most practical and preferred embodiments, it is to be understood that the invention is not to be limited to the disclosed embodiment, but on the contrary, is intended to cover various modifications and equivalent arrangements cope of the appended claims, which are incorporated herein by reference.

What is claimed is:

1. A spatial-shifting unit using optical fibers to spatially shift individual light beams, said spatial-shifting unit comprising:
    a shifting entrance plane, said shifting entrance plane comprising at least one array of signal input positions, each said signal input position adapted to receive a light beam from a source, each said light beam having an initial frequency;
    a shifting exit plane, said shifting exit plane comprising a respective number of signal output positions as said signal input positions in said shifting entrance plane, each said signal output position connected to a corresponding signal input position by an optical fiber, wherein each said optical fiber is the same length as every other optical fiber in said spatial-shifting unit, wherein a said light beam incident on a said signal input position traverses said optical fiber prior to being emitted from said spatial-shifting unit at a respective said signal output position, and wherein each said light beam emitted from said spatial-shifting unit has retained said initial frequency.

2. An apparatus for optically shifting signals comprising:
    an auxiliary mirror;
    a micro-electro-mechanical device;
    a shifting unit, said shifting unit comprising:
        a shifting entrance plane, said shifting entrance plane comprising at least one row of signal input positions, each said signal input position adapted to receive an optical beam from a source;
        a shifting exit plane, said shifting exit plane comprising a respective number of rows of signal output positions, each said signal output position adapted to output said optical beam; and
        wherein each said signal input position of a given row is connected by an optical fiber to a corresponding signal output position, each said optical fiber being the same length as every other optical fiber in said shifting unit; and
    a first pair of spherical mirrors, each said spherical mirror of said first pair of spherical mirrors having a center of curvature, said first pair of spherical mirrors positioned such that the images of said center of curvature of each said spherical mirror lies between said auxiliary mirror and said micro-electro-mechanical device; and
    a second pair of spherical mirrors, each said spherical mirror of said second pair of spherical mirrors having a center of curvature, said second pair of spherical mirrors positioned such that the images of said center of curvature of each said spherical mirror lies between said micro-electro-mechanical device and said shifting unit, wherein said auxiliary mirror, said micro-electro-mechanical device, and said shifting entrance plane are mutually optical conjugates of one another.

3. An apparatus according to claim 2 wherein said auxiliary mirror and said micro-electro-mechanical device lie in a first plane and said shifting entrance plane and said shifting exit plane lie in a second plane.

4. An apparatus according to claim 3 further comprising at least one optical element disposed between said first plane and said second plane.

5. An apparatus for optically shifting signals comprising:
    a micro-electro-mechanical device disposed in a first plane;
    an auxiliary mirror disposed in a second plane;
    a shifting unit disposed in a third plane, said shifting unit comprising:
        a shifting entrance plane, said shifting entrance plane comprising at least one row of signal input positions, each said signal input position adapted to receive an optical beam from a source;
        a shifting exit plane, said shifting exit plane comprising a respective number of rows of signal output positions, each said signal output position adapted to output said optical beam; and
        wherein each said signal input position of a given row is connected by an optical fiber to a corresponding signal output position, each said optical fiber being the same length as every other optical fiber in said shifting unit; and
    a pair of lenses, said pair of lenses disposed between said shifting unit and said micro-electro-mechanical device, wherein said auxiliary mirror, said micro-electro-mechanical device, and said shifting entrance plane are mutually optical conjugates of one another.

6. An apparatus according to claim 5 further comprising at least one optical element disposed between said first plane and said second plane.

7. A method for optically shifting a signal, said method comprising the steps of:
    modulating an input signal onto an optical beam;
    passing said optical beam through an apparatus for optically shifting signals, said apparatus comprising:
        an auxiliary mirror;
        a micro-electro-mechanical device;
        a shifting unit, said shifting unit comprising:
            a shifting entrance plane, said shifting entrance plane comprising at least one row of signal input positions, each said signal input position adapted to receive an optical beam from a source;

a shifting exit plane, said shifting exit plane comprising a respective number of rows of signal output positions, each said signal output position adapted to output said optical beam; and wherein each said signal input position of a given row is connected by an optical fiber to a corresponding signal output position, each said optical fiber being the same length as every other optical fiber in said shifting unit; and a first pair of spherical mirrors, each said spherical mirror of said first pair of spherical mirrors having a center of curvature, said first pair of spherical mirrors positioned such that the images of said center of curvature of each said spherical mirror lies between said auxiliary mirror and said micro-electro-mechanical device; and a second pair of spherical mirrors, each said spherical mirror of said second pair of spherical mirrors having a center of curvature, said second pair of spherical mirrors positioned such that the images of said, center of curvature of each said spherical mirror lies between said micro-electro-mechanical device and said shifting unit; and down-converting said optical beam to an output signal.

8. A method for optically shifting a signal, said method comprising the steps of:

modulating an input signal onto an optical beam;

passing an optical beam through an apparatus for optically shifting signals, said apparatus comprising:

a micro-electro-mechanical device disposed in a first plane;

an auxiliary mirror disposed in said first plane;

a shifting unit disposed in a second plane, said shifting unit comprising:

a shifting entrance plane, said shifting entrance plane comprising at least one row of signal input positions, each said signal input position adapted to receive an optical beam from a source;

a shifting exit plane, said shifting exit plane comprising a respective number of rows of signal output positions, each said signal output position adapted to output said optical beam; and wherein each said signal input position of a given row is connected by an optical fiber to a corresponding signal output position, each said optical fiber being the same length as every other optical fiber in said shifting unit; and a pair of lenses, said pair of lenses disposed between said shifting unit and said micro-electro-mechanical device; and downconverting said optical beam to an output signal.

9. The spatial shifting unit according to claim 1 wherein said array of signal input positions is configured in rows.

* * * * *

UNITED STATES PATENT AND TRADEMARK OFFICE
CERTIFICATE OF CORRECTION

PATENT NO. : 6,724,951 B1
DATED : April 20, 2004
INVENTOR(S) : Anderson et al.

It is certified that error appears in the above-identified patent and that said Letters Patent is hereby corrected as shown below:

Column 5,
Line 1, please delete "is Upped slightly" and insert -- is tipped slightly --.
Line 32, please delete "arrangements cope of the" and insert -- arrangements included within the spirit and scope of the --.

Signed and Sealed this

Seventh Day of December, 2004

JON W. DUDAS
*Director of the United States Patent and Trademark Office*